United States Patent [19]

Sporzynski et al.

[11] Patent Number: 5,105,917

[45] Date of Patent: Apr. 21, 1992

[54] DISC BRAKE PISTON

[75] Inventors: Robert S. Sporzynski, Chelsea; Anthony C. Evans, Northville, both of Mich.

[73] Assignee: Kelsey-Hayes Company, Romulus, Mich.

[21] Appl. No.: 636,648

[22] Filed: Dec. 31, 1990

[51] Int. Cl.$^5$ .................... F16D 55/18; F16J 1/00
[52] U.S. Cl. .................... 188/72.4; 188/370; 92/172; 92/168
[58] Field of Search ............ 92/172, 107, 168 R, 92/208, 129, 168 B; 188/72.4, 73.31, 73.43, 73.44, 370; 29/888.04

[56] References Cited

U.S. PATENT DOCUMENTS

| 3,804,212 | 4/1974 | Haraikawa | 188/370 |
|---|---|---|---|
| 4,170,926 | 10/1979 | Emmett . | |
| 4,193,179 | 3/1980 | Confer et al. | 29/888.04 |
| 4,354,303 | 10/1982 | Staley . | |
| 4,428,461 | 1/1984 | Warwick . | |
| 4,530,312 | 7/1985 | Kanda et al. | 92/186 |
| 4,553,644 | 11/1985 | Folch . | |
| 4,565,265 | 1/1986 | Woolley | 188/370 |
| 4,887,449 | 12/1989 | Kanai et al. | 29/888.04 |

FOREIGN PATENT DOCUMENTS

| 2134940 | 9/1978 | Fed. Rep. of Germany | 188/370 |
|---|---|---|---|
| 1358613 | 3/1964 | France | 188/73.43 |
| 0076735 | 6/1981 | Japan | 29/888.04 |
| 0090130 | 7/1981 | Japan | 29/888.04 |
| 0091930 | 2/1988 | Japan | 29/888.04 |
| 0091930 | 4/1989 | Japan | 29/888.04 |

Primary Examiner—Edward K. Look
Assistant Examiner—Thomas Denion
Attorney, Agent, or Firm—MacMillan, Sobanski & Todd

[57] ABSTRACT

A disc brake piston is formed from a stamping operation and is preferably constructed from stainless steel. The piston includes a hollow cylindrical body having a closed end and an open end. In one preferred embodiment, the open end is provided with a radially outwardly extending flange which defines an annular abutment surface for engaging a backing plate of a disc brake shoe. An integral boot groove is formed in the cylindrical body adjacent the open end thereof, and produces a raised portion on an inner surface of the body portion directly opposite the groove. This results in the piston having a substantially uniform wall thickness throughout the entire length of the cylindrical body. Also, the piston can include a dome-shaped recess formed in the closed end thereof, which can be provided with radial strengthening ribs.

20 Claims, 2 Drawing Sheets

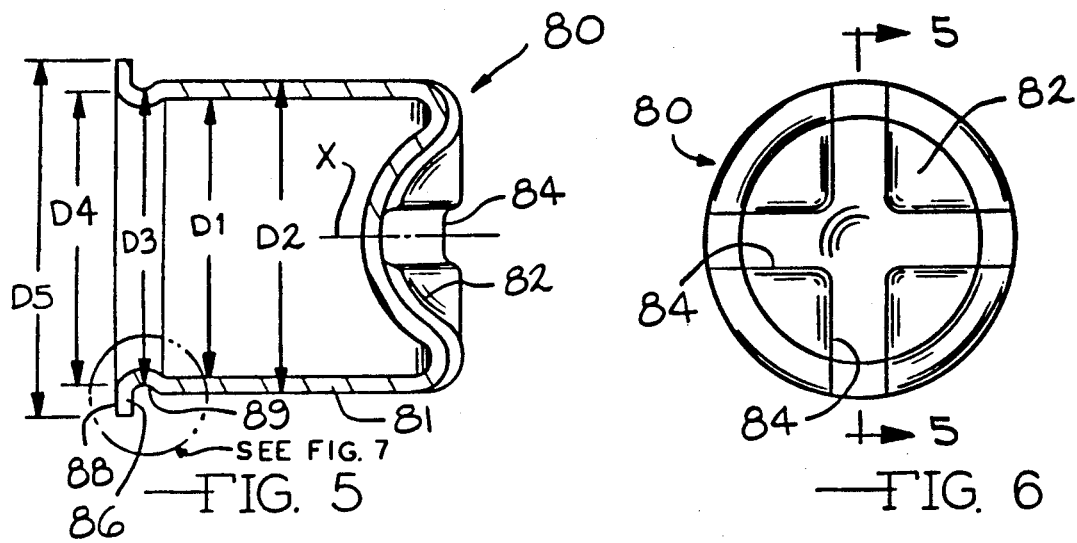
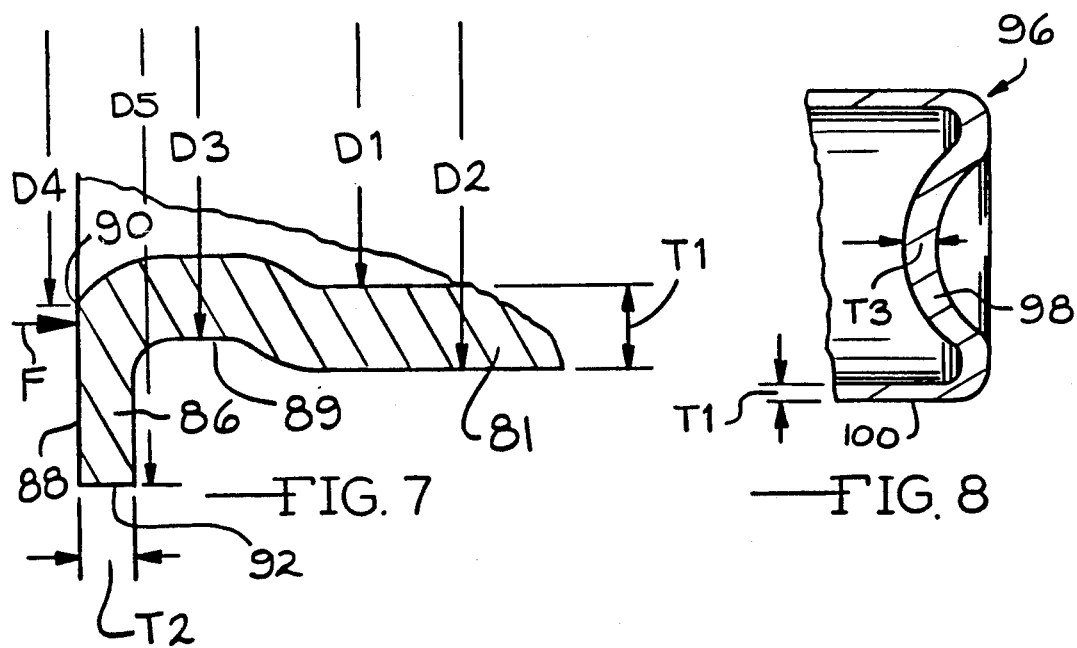

DISC BRAKE PISTON

BACKGROUND OF THE INVENTION

This invention relates in general to a disc brake assembly and in particular to an improved disc brake piston structure.

Disc type brakes assemblies for vehicles are well known and generally include one or more pistons which are actuated, typically by pressurized hydraulic fluid, to force a pair of brake shoes against an associated brake rotor. Many various piston structures, constructed of either metal or plastic, have been proposed and used in disc brake assemblies. The pistons are generally cylindrical and are provided with an abutment surface at one end thereof for engagement with one of the brake shoes. The one end of the piston also includes an outer annular boot groove which, in many instances, is machined into the cylindrical wall of the piston, and is adapted to receive one end of a flexible dust boot. Because the machining operation of the boot groove weakens the side wall of the piston at the location of the groove, it is important that the original thickness of the piston side wall in this region be sufficient to accommodate the groove.

SUMMARY OF THE INVENTION

This invention relates to a disc brake piston which can be formed from a stamping operation and is preferably constructed from stainless steel. The piston includes a generally hollow cylindrical body having a closed end and an open end. The open end defines an annular abutment surface for engagement with the backing plate of a brake shoe of a disc brake assembly. The abutment surface can be defined by a radially extending flange provided at the open end thereof. An integral boot groove is formed into the side wall of the piston adjacent the open end thereof, and preferably has a depth which defines a diameter greater than or equal to the inner diameter of the cylindrical body. In one preferred embodiment, the flange extends radially outwardly from the open end, and defines an abutment surface which extends inwardly to define a diameter less than the diameter defined by the depth of the boot groove. Such a structure has been found to minimize the bending stresses in the region of the flange and the boot groove, thus enabling the piston to be effectively used in high pressure applications.

When the integral boot groove is formed adjacent the open end thereof, a corresponding annular raised portion is produced on an inner surface of the cylindrical body directly opposite the groove. This results in the piston having a substantially uniform wall thickness throughout the entire length of the cylindrical body. Also, the piston can include a dome-shaped recess formed in the closed end thereof, and which can be provided with radial strengthening ribs to increase the pressure handling capabilities of the piston.

Other features and advantages of this invention will become apparent to those skilled in the art from the following detailed description of the preferred embodiments, when read in light of the accompanying drawings.

BRIEF DESCRIPTION OF THE DRAWINGS

FIG. 5 is a cross-sectional view similar to FIG. 2, taken along the line 5—5 of FIG. 6, but showing a piston with a modified flange structure and a modified recessed dome structure.

FIG. 6 is an end view of the piston in FIG. 5, and shows the radial strengthening ribs formed in the recessed dome.

FIG. 7 is an enlarged sectional view of the circled portion of FIG. 5, and shows the flattened abutment surface.

FIG. 8 is a sectional view of a piston with another modified recessed dome structure wherein the dome portion is formed of an increased wall thickness relative to the cylindrical body portion.

DETAILED DESCRIPTION OF THE PREFERRED EMBODIMENTS

Figure 1:
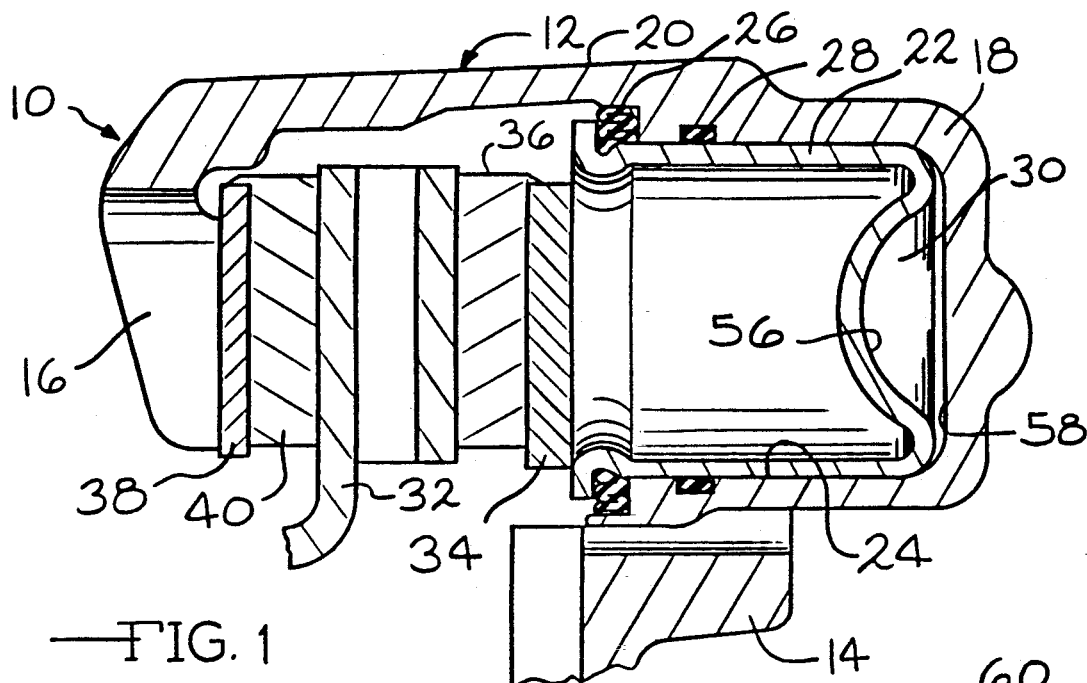
FIG. 1 is a cross-sectional view of a disc brake assembly having a piston constructed in accordance with this invention.

Referring now to the drawings, there is illustrated in FIG. 1 a conventional disc brake assembly, indicated generally at 10, and which can incorporate a piston 22 embodying the principles of the present invention. The disc brake assembly 10 generally corresponds to the assembly shown in U.S. Pat. No. 4,331,221, which is herein incorporated by reference. It should be noted that, while the invention is described for use with the particular disc brake structure shown in this patent, the invention can readily be used with other disc brake structures.

The disc brake 10 comprises a generally C-shaped caliper 12 slidably supported on pins (not shown) secured to an anchor plate 14 which is secured to a fixed part of the vehicle. The caliper 12 includes an outboard leg 16 and an inboard leg 18 interconnected by a bridge portion 20. The inboard caliper leg 18 contains the hydraulic actuation means. The actuation means comprises the piston 22 which is reciprocally received within a bore 24 formed in the inboard leg 18. The brake assembly further includes a dust boot seal 26 and an annular hydraulic fluid seal 28. The dust boot seal 26 is intended to keep out most of the elements of weather, i.e., salt, water and mud. The annular seal 28 is designed to provide a sealed chamber 30 into which hydraulic fluid may be introduced under pressure so as to actuate the piston 22 in an outboard direction toward a rotor 32. When fluid is introduced into the chamber 30, the piston 22 is caused to slide within the bore 24 to engage a backing plate 34 of an inboard friction pad 36. At the same time, the caliper 12 slides on the pins so that the outboard leg 16 of the caliper 12 engages a backing plate 38 of an outboard friction pad 40. Thus, when hydraulic fluid is forced into the chamber 30, the friction pads 36 and 40 are operatively moved toward one another into frictional engagement with the oppositely facing surfaces of the rotor 32 to cause braking thereof.

Figure 2:
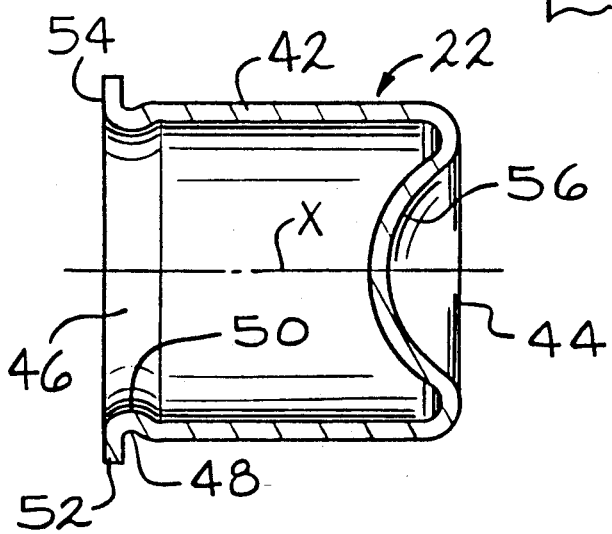
FIG. 2 is an enlarged cross-sectional view of the piston illustrated in FIG. 1.
Figure 3:
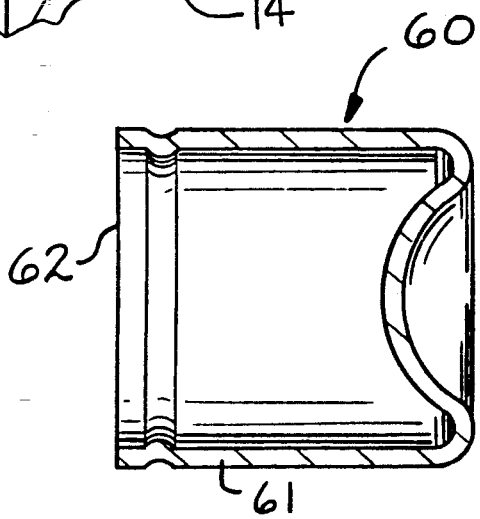
FIG. 3 is a cross-sectional view similar to FIG. 2 and showing an alternate embodiment of the piston.

Turning now to FIGS. 2 and 3, the specific construction of one embodiment of the piston 22 will be discussed. Preferably, the piston 22 is formed by a stamping operation and is constructed from a steel, such as stainless steel. The piston 22 includes a hollow cylindrical body portion 42 having a predetermined length and defining a longitudinal axis X. The body 42 includes a closed end 44 and an open end 46. An outer annular groove 48 is provided in an outer surface of the body 42 adjacent the open end 46. When the groove is formed, a corresponding raised annular portion 50 is formed on an inner surface of the body 42 directly opposite the groove 48. Thus, the groove 48 in cooperation with the raised portion 50 forms a substantially uniform wall thickness along the entire predetermined length of the cylindrical body 42.

An integral flange 52 is provided at the open end 46 of the body 42, and extends radially outwardly from the body 42 to form an abutment surface 54. The abutment surface 54 is oriented perpendicular relative to the longitudinal axis X. The abutment surface 54 is adapted to engage the backing plate 34 of the inboard friction pad 36 when the chamber 30 is pressurized to cause the piston 22 to slidingly move toward the rotor 32. Also, the flange 52 forms an effective piston diameter which is greater than the outer diameter of the body 42. This tends to reduce the radial and tangential taper wear of the piston 22. The flange 52 further reduces the contact stresses between the piston 22 and the outer surface of the inner backing plate 34. This reduction in contact stresses can reduce the tendency of the piston 22 to cut through a noise insulator (not shown) if one is located between the backing plate 34 and the piston 22.

The closed end 44 of the piston 22 is formed with a generally dome-shaped recess 56. The recess 56 in combination with an inner surface 58 of the inboard leg 18 of the caliper 12 defines the fluid chamber 30 which is adapted to receive the pressurized fluid.

Turning now to FIG. 3, an alternate embodiment of the piston illustrated in FIGS. 1 and 2 will be discussed. FIG. 3 illustrates a piston 60 which is essentially identical to the piston 22 of FIG. 2, except it does not include a radially outwardly extending flange. In this embodiment the edge of the open end of the cylindrical body 61 defines an abutment surface 62.

Figure 4:
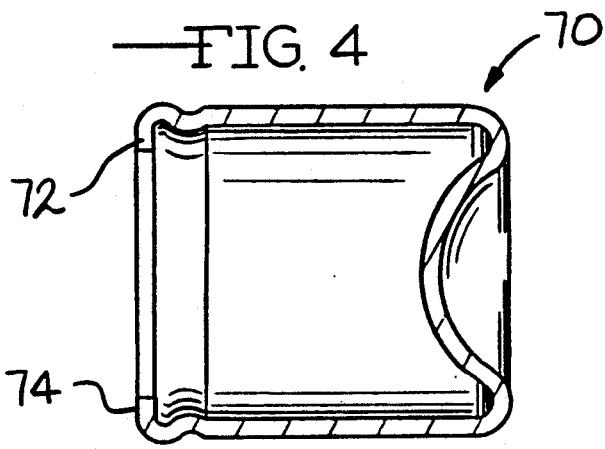
FIG. 4 is a cross-sectional view similar to FIG. 2 and showing a further alternate embodiment of the piston.

FIG. 4 shows another embodiment of the invention. In this embodiment, a piston 70 is also essentially identical to the piston of FIG. 2, except that instead of extending radially outwardly, an end flange 72 extends radially inwardly to define an abutment surface 74.

FIGS. 5, 6, and 7 illustrate a modified version of the piston shown in FIG. 2. In particular, the modified piston, generally indicated at 80, includes a cylindrical body portion 81 having a dome-shaped closed end 82 provided with radial strengthening ribs 84, as shown in FIG. 6. The cylindrical body 81 defines an inner diameter D1 and an outer diameter D2. Also, as shown in FIG. 7, the piston 80 includes a radially outwardly extending flange 86 defining an abutment surface 88 perpendicular to the piston axis X. An annular boot groove 89 is formed adjacent the flange 86 and has a depth which defines a diameter D3. In the modified version of FIG. 5, the area of the abutment surface 88 has been increased by machining or flattening the end flange. In this case, the abutment surface will extend radially inwardly to a circle (shown at a point 90 in FIG. 7) which defines a diameter D4, and radially outwardly to an annular end 92 which defines a diameter D5. Preferably, in high fluid pressure application when piston structural integrity is a critical design consideration, it is important that the diameter D3 should be greater than or equal to the diameter D1, and the diameter D4 should be less than the diameter D3, and the diameter D5 should be greater than the diameter D2, as shown in FIGS. 5 and 7. With this embodiment, it has been found that axial forces on the abutment surface, represented in FIG. 7 by the arrow F, create less stress in the region of the flange and the boot groove, because they are more readily absorbed by the side wall of the piston. However, it should be noted that in lower pressure applications, the diameter D3 can be less than the diameter D1. Machining or flattening the flange 86 results in the flange having a thickness T2, which is less than the thickness T1 of the cylindrical side wall 81.

FIG. 8 illustrates a further embodiment of a piston 96 having a modified dome-shaped end 98. In this embodiment, instead of the ribs 84 shown in FIGS. 5 and 6, the strength of the piston in the region of the dome shaped end 98 is increased by increasing the wall thickness to an amount T3, which is greater than the thickness T1 of the piston sidewall 100.

It will be appreciated that, while the preferred embodiment has been described as being formed from stainless steel, other materials are also suitable such as, for example, carbon steel (which is subsequently plated), aluminum, and titanium.

The principles and mode of operation of the invention have been described and illustrated in its preferred embodiments. However, it must be understood that the invention may be practiced otherwise than as specifically explained and illustrated without departing from the scope of the attached claims.

We claim:

1. A piston adapted for use in a disc brake assembly comprising:
    a cylindrical hollow body defining an axis and including an open end and a closed end, said cylindrical body including an outer wall defining a first diameter; and
    a radially extending flange provided at said open end of said cylindrical body, said flange extending radially outwardly relative to said outer wall of said cylindrical body, said flange defining a second diameter at an outer end thereof greater than said first diameter of said cylindrical body, and said flange defining an abutment surface perpendicular to said axis and adapted to engage a brake show of the disc brake assembly.

2. The piston defined in claim 1 and further including an outer annular boot groove formed in an outer surface of said cylindrical body adjacent said open end.

3. The piston defined in claim 2 and further including a generally dome-shaped recess formed in said closed end of said cylindrical body.

4. The piston defined in claim 3 wherein said dome-shaped recess is provided with a plurality of strengthening ribs, said ribs extending radially inwardly from an outer region of said closed end and connected together at said axis of said cylindrical body.

5. The piston defined in claim 2 wherein an inner wall of said cylindrical body defines a third diameter and wherein said groove is formed to a depth to define a fourth diameter greater than or equal to said third diameter.

6. The piston defined in claim 5 wherein said abutment surface extends radially inwardly to define a fifth diameter less than said fourth diameter.

7. The piston defined in claim 6 wherein said cylindrical body has an inner annular raised portion formed on an inner wall thereof opposite said boot groove.

8. The piston defined in claim 1 wherein said cylindrical body has a predetermined length and has an outer annular boot groove formed therein adjacent said open end and an inner annular raised portion formed therein opposite said boot groove, and wherein said cylindrical body has a substantially uniform wall thickness along the entire predetermined length.

9. The piston defined in claim 1 wherein said piston is formed of stainless steel.

10. A disc brake assembly comprising:
 a caliper having a bore formed therein;
 a piston slidably received within said bore and including a cylindrical hollow body having a predetermined length and including an open end and a closed end;
 an outer annular boot groove formed in an outer surface of said cylindrical body adjacent one end thereof;
 an inner annular raised portion formed on an inner surface of said cylindrical body opposite said boot groove;
 a dust boot seal having one end sealing coupled to said caliper and an opposite end sealingly disposed in said outer annular boot groove formed in said cylindrical body; and
 said cylindrical body having a substantially uniform wall thickness along the entire predetermined length thereof.

11. The disc brake assembly defined in claim 10 wherein said boot groove is formed adjacent said open end.

12. The disc brake assembly defined in claim 11 wherein said cylindrical body defines an axis and wherein said open end defines an abutment surface perpendicular to said axis and adapted to engage a brake shoe of the disc brake assembly.

13. The disc brake assembly defined in claim 12 and further including a radially outwardly extending flange provided at said open end of said cylindrical body.

14. The disc brake assembly defined in claim 13 wherein said cylindrical body has a predetermined length and has an outer annular boot groove formed therein adjacent said open end and an inner annular raised portion formed therein opposite said boot groove, and wherein said cylindrical body has a substantially uniform wall thickness along the entire predetermined length.

15. The disc brake assembly defined in claim 12 and further including a radially extending flange provided at said open end of said cylindrical body.

16. The disc brake assembly defined in claim 10 and further including a dome-shaped recess formed in said closed end of said cylindrical body.

17. The disc brake assembly defined in claim 11 wherein said dome-shaped recess is provided with a plurality of radially inwardly extending strengthening ribs.

18. The disc brake assembly defined in claim 10 wherein said piston is formed of stainless steel.

19. A piston adapted for use in a disc brake assembly comprising:
 a cylindrical hollow body defining an axis and including an open end and a closed end;
 a dome-shaped recess formed in said closed end of said cylindrical body; and
 a plurality of strengthening ribs provided in said dome-shaped recess, said ribs extending radially inwardly from an outer region of said closed end and connected together at said axis of said cylindrical body.

20. The piston defined in claim 19 and further including a radially extending flange provided at said open end of said cylindrical body, said flange defining an abutment surface perpendicular to said axis and adapted to engage a brake shoe of the disc brake assembly.

* * * * *